UNITED STATES PATENT OFFICE.

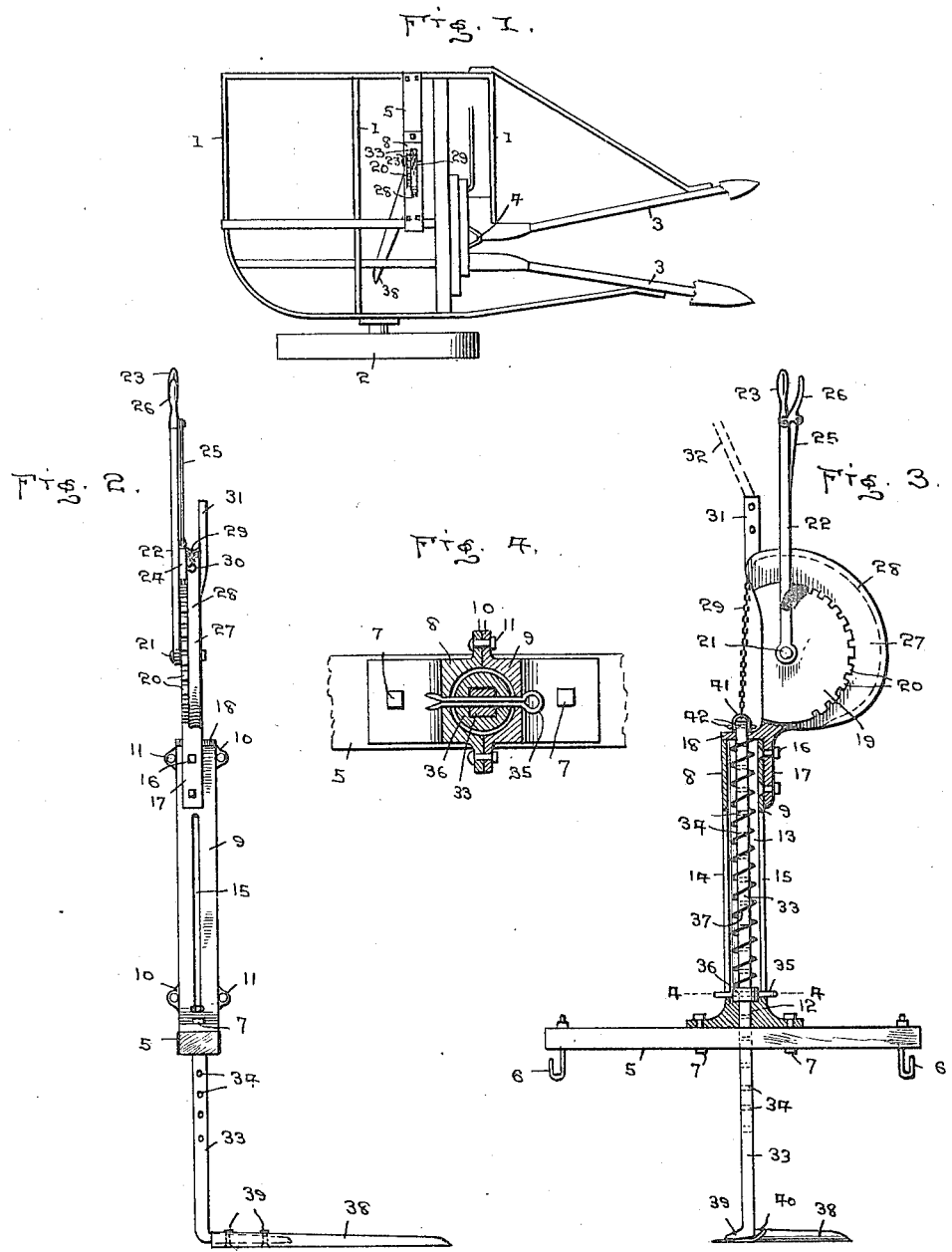

BERNARD A. SCHULTZ, OF DE FOREST, WISCONSIN.

STUB-CUTTER ATTACHMENT FOR CORN-HARVESTERS.

1,123,398.      Specification of Letters Patent.      Patented Jan. 5, 1915.

Application filed April 7, 1914. Serial No. 830,193.

*To all whom it may concern:*

Be it known that I, BERNARD A. SCHULTZ, a citizen of the United States, residing at De Forest, in the county of Dane and State of Wisconsin, have invented certain new and useful Improvements in Stub-Cutter Attachments for Corn-Harvesters; and I do hereby declare the following to be a full, clear, and exact description of the invention, such as will enable others skilled in the art to which it appertains to make and use the same.

This invention relates to stub cutter attachments for corn harvesters and has for one of its objects the provision of a stub cutter which is capable of ready attachment to any of the well known corn harvesters now in use.

A further object resides in the provision of a stub cutter attachment positioned at any convenient point upon a corn harvester and rearwardly of the cutting mechanism of the same whereby the corn stubble which is left by the cutting apparatus of the harvester may be severed at a point in close proximity to the ground.

A still further object of this invention resides in the provision of a stub cutter attachment for harvesters whereby the harvesting of the crop of corn and the severing of the stubble thereafter may be completed in one operation. And a still further object of this invention resides in the construction of a stub cutter attachment for corn harvesters which may be conveniently mounted upon the machine within easy reach of the operator whereby the stub cutter attachment may be readily actuated.

Another object of this invention resides in the provision of means for efficiently severing at the surface of the ground the corn stubble which has been left by the corn harvester whereby the field is prepared for the future harrowing of the ground and drilling of the seed of the crop following thereafter.

These and other objects will more fully appear and the nature of the invention more clearly understood by the construction, combination and arrangement of the parts thereof as described in the following specification, defined in the appended claims and illustrated in the accompanying drawings, in which, Figure 1 is a top view of a fragmentary portion of the frame of a corn harvester showing the cutting knives and the manner of mounting the stub cutter attachment thereon at the rear and in close proximity to the cutting knives of the harvester. Fig. 2 is a rear elevational view of the stub cutter attachment. Fig. 3 is a side elevation of the same, a portion thereof being shown in section. Fig. 4 is a fragmentary detailed view on line 4—4 of Fig. 3 showing the construction and assembling of the parts for maintaining the stub cutter knife.

Referring to the drawings 1 represents the bars of the frame of the corn harvester having the grain wheel 2 arranged at the side thereof, 3 the gathering mechanism and 4 the cutting knives of the harvester.

My stub cutter attachment consists of the base 5 preferably elongated and rectangular in cross section and which may be formed of either wood or metal and provided at each of its ends with the hook bolts 6 or other suitable securing means for attaching the base member 5 to the frame 1 of the corn harvester. Secured upon the base 5 through the means of bolts 7 is the elongated supporting member formed in half sections 8 and 9 each provided with registering ears 10 and secured together by the bolts 11, the lower ends of the sections 8 and 9 being provided with recesses to form the square socket 12, the upper portion of the sections 8 and 9 forming the cylindrical interior portion 13. The sections 8 and 9 are provided with the elongated slots 14 and 15 respectively, the slots being disposed diametrically opposite each other.

Arranged upon the upper ends of the sections 8 and 9 and secured thereon by the bolts 16 is the bracket 17 provided with the laterally extending cover 18 embracing the upper edges of the sections 8 and 9. Upon the bracket 17 is arranged the approximately semi-circular rack bar 19 provided with the teeth 20, and concentrically with the teeth 20 is arranged the pivot bolt 21 upon which is mounted the lever 22 provided with the handle 23, the lever 22 being further provided with the spring latch 24 for engaging the teeth 20 of the rack bar 19, the spring latch 24 being connected by the rod 25 with the thumb piece 26 arranged upon the lever 22 adjacent the handle 23.

Arranged at one side of the semi-circular rack bar 19 is the approximately semi-circular disk member 27, the disk 27 being larger than the rack bar 19 and being provided further with the groove or valley 28 in which is designed to travel the chain 29 connected to the lever 22 in any suitable manner as shown at 30. Upon the upper edge of the disk 27 is the arm 31 to which is connected any suitable form of brace bar 32 for connecting the upper portion of the stub cutter attachment at any suitable point upon the corn harvester.

Resiliently and adjustably mounted within the sections 8 and 9 and projecting therethrough is the shaft 33 preferably square in cross section and adapted to pass through the socket 12 which is also square thus preventing the rotation of the shaft 33. The shaft 33 is provided with the plurality of apertures 34 for receiving the cotter pin 35, which pin is of sufficient length to pass through each of the slots 14 and 15 of the respective sections 8 and 9 as well as through certain of the apertures 34, and surrounding the shaft 33 and resting upon the cotter pin 35 is the washer 36 between which and the cover 18 is the compression spring 37 for normally holding the shaft 33 in a downward direction. Upon the lower end of the shaft 33 beneath the base 5 of the stub cutter attachment is the knife 38 secured to the lower end of shaft 33 by the rivets 39 or other suitable connections, the knife 38 having its rear edge curved upwardly as at 40, the knife 38 is positioned at the rear of the cutting knives 4 of the harvester in close proximity thereto and is positioned rearwardly at an angle of approximately 45 degrees, the knife being stationary and inclined efficiently severs the stubble from the ground, the rear edge of the blade being curved upwardly as at 40 as well as the rearward inclination of the knife 38, prevents the collection of dry grass or other trashy substance thereupon which may be upon the ground, whether the machine is being backed or driven forwardly. Upon the upper end of shaft 33 is the clevis 41 attached to the lower end of the chain 29 and secured to the shaft 33 through the means of the bolt or cotter pin 42 passing through one of the apertures 34 at the upper end of the shaft 33.

It is to be here noted that in the construction and arrangement of the parts constituting my stub cutter attachment for corn harvesters the cutting knife 38 may be adjusted at any desired distance below the frame of the machine for efficiently cutting the corn stubble left thereby, the adjustment being accomplished by the placing of the cotter pin 35 in any of the desired apertures 34 at the lower end of shaft 33, as well as the adjustment of the clevis 41 at the end of chain 29 in any of the desired apertures in the upper part of the shaft 33, the clevis being raised and lowered by the rearward or forward movement of the lever 22 and retained in such position by the engagement of the spring latch 24 with the teeth 20 of the semi-circular rack bar 19, upon which movements the chain 29 is designed to travel in the groove or valley 28 of the disk 27. The spring 37 is not only designed to bear against the washer 36 and the cotter pin 35 for maintaining the knife in its normal downward position, but should the knife run into obstructions such as rocks or tufts, etc., upon the surface of the ground, the knife is capable through its yielding mounting to be forced upwardly against the action of the spring 37 thus eliminating all danger of breakage of the knife 38. The square socket 12 together with the cotter pin 35 passing through slots 14 and 15 of the sections 8 and 9 prevent any rotation of the shaft 33 thus providing a stationary knife attachment.

While I have here shown the preferred embodiment of my invention, I hereby reserve the right to make such alterations and variations therein from time to time as I may deem expedient and which will neither depart from the spirit of this invention nor conflict with the scope of the claims.

Having thus fully described my invention, what I claim as new and desire to secure by Letters-Patent of the United States is:

1. In a stub cutter attachment for corn harvesters, in combination with the frame thereof, a base member secured upon said frame, a support upon said base member, a shaft mounted within said support, and a knife upon the end of said shaft for cutting the corn stubs.

2. In a stub cutter attachment for corn harvesters, in combination with the frame and the cutters thereof, a base member secured upon said frame adjacent said cutters, a support upon said base member, a non-rotatable shaft mounted within said support, and a knife upon the lower end of said shaft for cutting the corn stubs as the same pass from said cutters.

3. In a stub cutter attachment for corn harvesters, in combination with the frame and stalk cutters thereof, a base member secured to said frame adjacent said stalk cutters, a support upon said base member having a square socket formed therein, a square shaft passing through said square socket and non-rotatable, a laterally extending knife arranged upon the lower end of said shaft and rearward of said stalk cutters, and means for raising and lowering said knife.

4. In a stub cutter attachment for corn harvesters, in combination with the frame and stalk cutters thereof, a base member secured to said frame adjacent said stalk cutters, a support arranged upon said base member, said support having a square socket in its lower portion and a tubular upper portion, a square shaft passing through said square socket and non-rotatably mounted therein, said shaft extending through said tubular portion, a laterally extending knife arranged upon the lower end of said shaft, and means connected to the upper end of said shaft for raising and lowering said knife.

5. A stub cutter attachment for corn harvesters, in combination with the frame and the cutters thereof, consisting of a base member, means for securing said base member to said frame, a support arranged upon said base member, said support comprising two sections secured together, each of said sections provided with a rectangular recess and a semi-cylindrical hollow portion to provide a square socket and cylindrical portion when secured together, said sections each provided with elongated slots therein, a square shaft extending through said socket and said cylindrical portion of said support, means for raising and lowering said shaft, a knife upon the lower end of said shaft, and means for resiliently and adjustably mounting said knife and said shaft in said support.

6. In a stub cutter attachment for corn harvesters, in combination with the frame and the cutters thereof, a base member secured to said frame adjacent said cutters, a support upon said base member, a shaft arranged within said support, a knife upon said shaft and rearward of said cutters, means for raising and lowering said shaft and said knife, means for yieldingly supporting said shaft and knife, and means for adjusting said shaft for regulating the height of the cut of said knife.

In testimony whereof I have signed my name to this specification in the presence of two subscribing witnesses.

BERNARD A. SCHULTZ.

Witnesses:
C. A. LINDE,
E. O. ROISUM.

Copies of this patent may be obtained for five cents each, by addressing the "Commissioner of Patents, Washington, D. C."